UNITED STATES PATENT OFFICE.

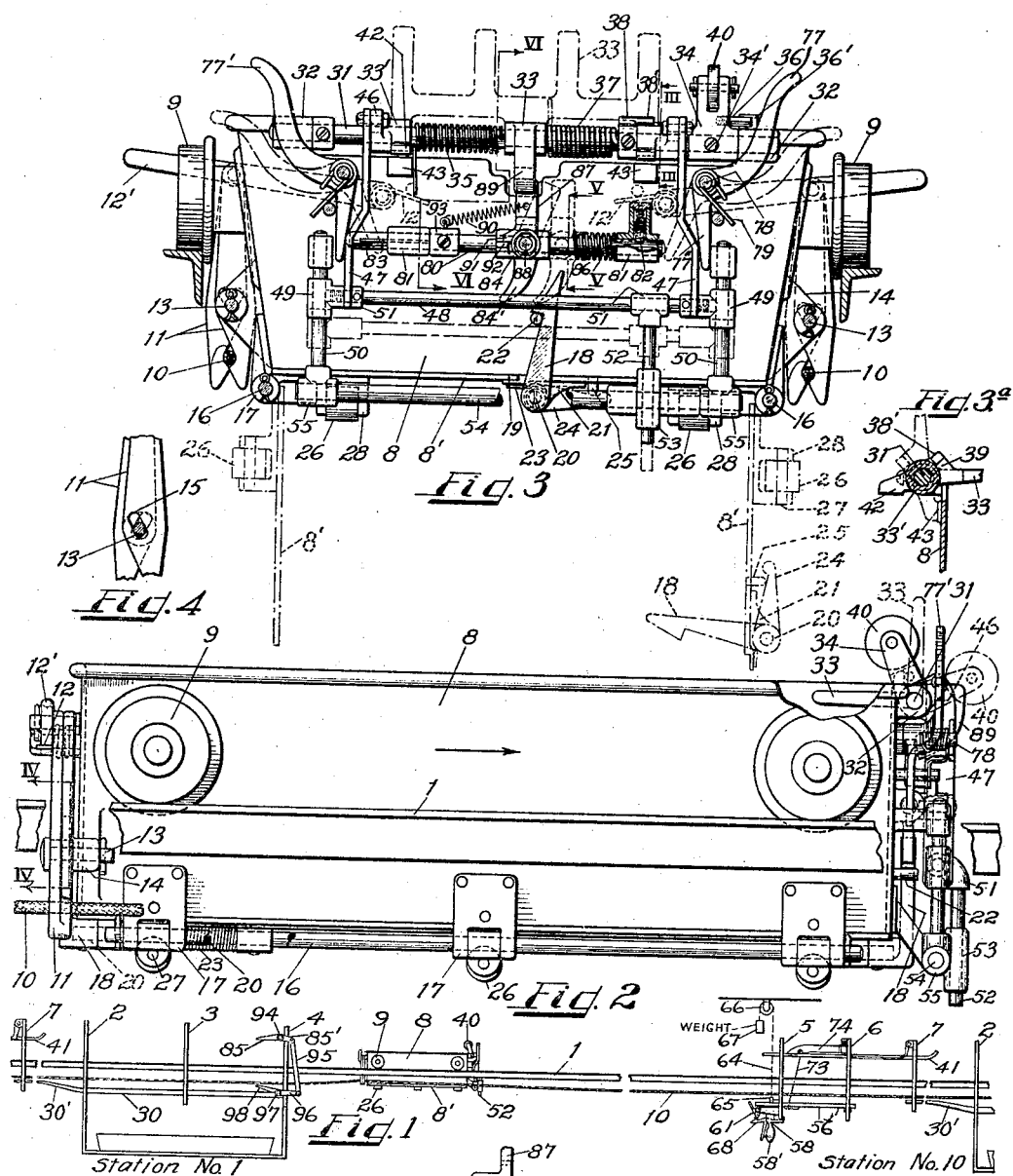

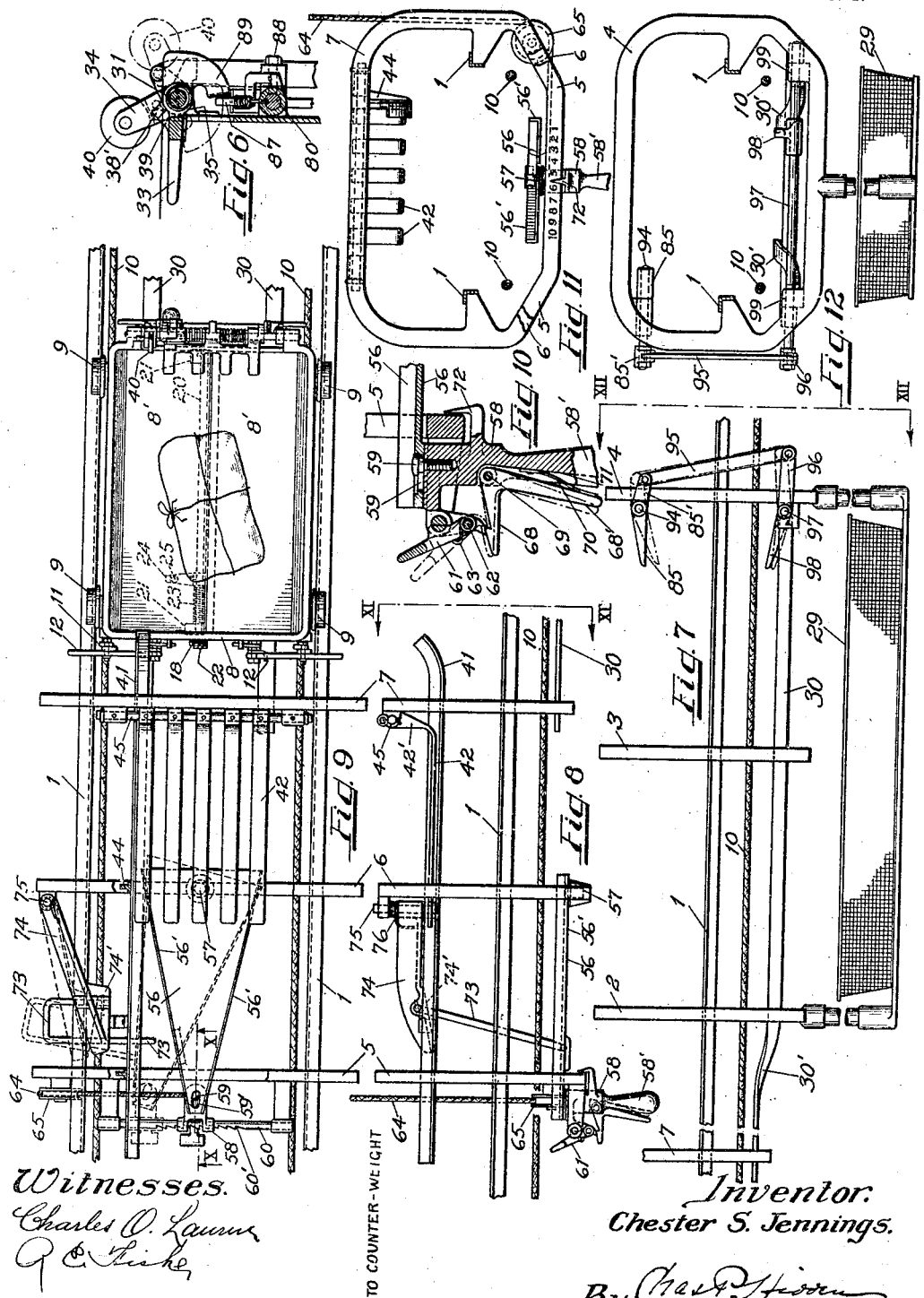

CHESTER S. JENNINGS, OF BOSTON, MASSACHUSETTS, ASSIGNOR TO THE LAMSON COMPANY, OF BOSTON, MASSACHUSETTS, A CORPORATION OF NEW JERSEY.

AUTOMATIC LOAD DESPATCHING AND DELIVERING APPARATUS.

1,244,856.　　　　　Specification of Letters Patent.　　Patented Oct. 30, 1917.

Application filed May 2, 1916.　Serial No. 94,985.

*To all whom it may concern:*

Be it known that I, CHESTER S. JENNINGS, a citizen of the United States, residing at Forest Hills, Boston, in the county of Suffolk and State of Massachusetts, have invented certain new and useful Improvements in Automatic Load Despatching and Delivering Apparatus, of which the following is a specification.

This invention relates to conveying apparatus and more particularly to automatic loading and delivery systems, such as are used for the transfer of parcels and the like from one given point to another; the articles to be carried being preferably automatically loaded onto a horizontally traveling carrier at one station or despatching point, and being thereafter automatically unloaded from said carrier at a predetermined station located along the path of said carrier.

The preferred embodiment of my invention contemplates the provision of an improved tray or carrier which is provided with means for sweeping off from platforms located along and preferably above its path of travel, parcels or the like which may have been emplaced upon said platforms, said tray or carrier being adapted to deliver its load at any one of a number of stations; the setting of the destination-controlling apparatus upon the tray or carrier being made at substantially the same time that the load is imposed thereon.

I have further aimed to so constitute the controlling mechanism for said carrier, that a loaded carrier will not pick up additional parcels or the like when passing stations intermediate its loading and discharging points.

Another object of my invention has been to provide means for preventing the inadvertent change of setting of the controlling mechanism upon any given carrier, while the latter is bearing its load toward the station at which it is to discharge said load.

Another object of my invention has been to so constitute the system that a very considerable number of stations may be served thereby; whereas in most of the pick-up and delivery systems which have come into extensive use, there is imposed a limitation upon the number of stations which can be served, by reason of the construction employed.

A further object of my invention has been to so construct the carriers that any one of them may be caused to pick up its load from any one of the stations and to thereafter deposit said load at any other one of the remaining stations.

Still another object of my invention has been to devise a system adapted for the handling of relatively bulky articles, and one moreover, in which the carriers may be loaded with, if desired, a plurality of parcels or the like, without danger of inadvertently dropping any of these latter along the line of travel of the carrier.

These and other objects of my invention will be hereinafter referred to and the novel elements and combinations of means whereby said object may be attained will be more particularly pointed out in the claims appended hereto.

In the drawings which form a part hereof and in which like reference characters designate like parts throughout the several views, I have exemplified a preferred embodiment of my invention; but as I am aware of very many changes and modifications which may be made herein without departing from the spirit of my invention, I desire to be limited only by the scope of said claims.

Referring to the drawings:

Figure 1 is a somewhat diagrammatic side elevation of a portion of a despatch system constructed in accordance with the principles of my invention.

Fig. 2 is a side view of a preferred type of carrier.

Fig. 3 is an end or rear view of said carrier.

Fig. 3ª is a detail section taken on the line III—III of Fig. 3.

Fig. 4 is a fragmentary detail section of a portion of the cable gripping mechanism; the section being taken on the line IV—IV of Fig. 2.

Fig. 5 is a detail section taken on line V—V of Fig. 3.

Fig. 6 is a similar section taken on line VI—VI of Fig. 3.

Fig. 7 is an enlarged side elevation of the unloading position of one of the stations shown in Fig. 1.

Fig. 8 is a similar view of the carrier loading apparatus shown in said Fig. 1.

Fig. 9 is a plan or top view of said loading apparatus, showing a carrier about to pass beneath the loading platform or table.

Fig. 10 is a detail section taken on line X—X of Fig. 9.

Fig. 11 is an end view of the loading apparatus shown in Fig. 8; said apparatus being viewed from the line XI—XI of said figure; and Fig. 12 is a similar view of the unloading mechanism, as seen from the line XII—XII of Fig. 7.

Where the apparatus is intended to handle somewhat bulky or heavy parcels or the like, I prefer to use an endless track composed of parallel rails 7, which may conveniently be made of angle iron. These rails are preferably elevated above the floor a sufficient distance to permit of the ready emplacement of loads upon the loading platforms hereinafter described, or the removal of said loads from the receiving pans. Accordingly, I prefer to support said rails at suitable intervals by brackets, such as those respectively designated 2, 3, 4, 5, 6 and 7.

Carriers 8 are provided with flanged wheels 9 which engage the rails as shown, for example, in Figs. 3 and 9; said carriers being drawn along by endless cables 10 with which their grip mechanisms can be engaged or disengaged at will. On each carrier, these mechanisms,—each identical except that they are respectively right and left handed,—comprise cable gripping jaws 11, preferably located adjacent the forward end of the carrier; each pair of said jaws being normally held closed by the action of a spring 12 upon its lever 12', which lifts the jaws up whereby to cam them together through the action of the fixed pin 13, which extends out from a lug 14 upon the side of the carrier and projects through the respective diverging slots 15 of said jaws. When a lever 12' is depressed, the jaws controlled thereby open and are caused to drop or pick up the corresponding cable, as desired.

The carrier itself preferably comprises a pan-like receptacle or tray which has a bottom composed of two doors or traps 8', respectively hinged upon longitudinally extending shafts 16, which extend through side lugs 17. The doors tend to swing open but are latched closed, by latches 18.

As viewed in Fig. 3, the right hand door overlaps the left-hand one, as at 19, and said right-hand door carries a rock-shaft 20, journaled in brackets 21; said shaft carrying upon its respective extremities said latches 18 which, when the doors are closed, engage pins 22, a coiled spring 23, on said shaft normally holding it and its latches in position to cause the latter to engage said pins. A stop arm 24 on shaft 20 engages a stop or pin 25 in the corresponding door, so that when said door is dropped open, as shown by dash and dot lines in Fig. 3, the latches will be in position to engage pins 22 as soon as the door is swung up.

Upon each of the doors is mounted a roller 26; and the pin 27 of such roller is journaled in a bracket 28 which is fastened to the under side of its door. When the latches are tripped in the manner hereinafter described, and the doors swing open to deposit the load therefrom into a tray or receptacle 29, said rollers move arcuately into engagement with closing bars 30 which first serve to limit the outward swing of the doors and thereafter close these latter where the rollers 26 ride over the twisted or cam-acting portions 30' of said bars. As best shown in Fig. 12, the twists in the bars 30 in any given pair of the latter, are so made as to cause the left-hand door, as per Fig. 3, to close slightly in advance of the right-hand door, to allow for the overlap 19.

At the upper rear edge of each carrier is a rock-shaft 31, journaled in lugs 32 attached to the carrier. This shaft carries sweep-off fingers 33 and an operating arm 34, the latter being secured in place thereon by a set-screw 34', as indicated in Fig. 3. A light spring 35 normally holds a stop pin 36 on the arm 34, in contact with a limiting lug 36', and when this arm is thus disposed, the fingers 33 occupy the position in which they are shown in full lines in Fig. 2; said fingers being connected to the shaft 31 by a stiff coiled spring 37 which normally tends to hold the stop lug 38' of a collar 38, which is set-screwed to a rock-shaft 31, against a boss 39 on one of the hubs 33' of the sweep-off fingers 33, as best shown in Fig. 3ª. Thus, normally, the fingers 33 will move in correspondence with the movements of the operating arm 34 and said arm and fingers are normally held in the positions in which they are shown in full lines in Fig. 2, by the light spring 35.

When the roller 40 upon the arm 34 engages a track cam 41, however and is rocked thereby to its dotted line position in Fig. 2, the fingers 33 are elevated, as indicated in Figs. 2 and 3 and pass between the slats or horizontally extended fingers 42 which constitute the despatching or loading platform at any given station, and the parcel or other load which has been placed on said platform preparatory to despatch, is swept off into the tray or receptacle 8 of the passing carrier.

The tray is preferably of sufficient size to adapt it to receive even a plurality of bulky parcels simultaneously, and abutments 42 on the hubs of the sweep off fingers are caused to engage pads or bosses 43 on the side of the receptacle 8, to sustain the thrust exerted against the sweep off fingers by heavy parcels which otherwise might rock the fingers back clear of such parcels.

Each cam 41 is supported by the brackets 5, 6 and 7 of the corresponding station; being preferably connected thereto by small angle brackets 44, as shown in Figs. 9 and 11.

The free ends of the loading platform fingers point in the direction in which the carrier is traveling and have their other extremities upturned as at 42' and pinned to a fixed shaft 45 which at each station is carried by the bracket 7 thereof.

I shall next consider the mechanism which determines the unloading point for a carrier which may be assumed to have loaded itself, so to speak, as it passed a given platform.

Upon each of the two hubs 33' of the fingers 33, is a short extension or arm 46 to which is pivotally connected a link 47, of which two are provided, one upon either side of the rear of the carrier. A shaft 48 extends through the lower ends of these links and is threaded at its ends into T-connections 49 which are slidable up and down on rods 50. Collars 51 may be provided to hold the ends of the links 47 close to these connections, and whenever the fingers 33 are rocked upwardly, it is evident that the shaft 48 will move downwardly toward its dotted line position, shown in Fig. 3.

Longitudinally slidable on shaft 48 is a third T connection or bracket 51 from which depends a rod 52 which is slidable up and down in a guide 53 which is in turn slidably mounted on a second cross-shaft 54. This latter is fixed, being carried by brackets 55 which also hold the lower ends of the rods 50. Brackets 55 are preferably attached directly to the adjacent wall of the carrier receptacle, as shown in Fig. 2.

From the foregoing it will be seen that the pin or rod 52 will also move up and down as the sweep-off fingers are rocked, while further, this pin is adjustable into any one of a plurality of positions laterally with respect to the line of travel of the carrier and it will move up and down in correspondence with the movements of the sweep-off fingers, no matter in which of said positions it may be located.

At each of the stations there is a tapered guiding trough 56 the sides 56' of which gradually approach each other toward the left as viewed in Fig. 9. This trough is pivoted to the frame 6 at 57 and its relatively free end is connected to a slide block 58 by a shoulder bolt 59, which extends up through a slot 59' in the bottom of the trough. As best shown in Fig. 10, the block 58 has a handle 58' by which its position lengthwise of the fixed shaft 60, upon which it is mounted, may be determined. This shaft is preferably notched as at 60' and the block 58 carries a detent 61 pivoted thereto at 62, said detent being normally held by its spring 63 in engagement with one or another of the notches 60' when the block 58 is operatively disposed. When the block is in the position in which it is shown in dotted lines in Fig. 9, this detent will at times simply press against an un-notched portion of the shaft 60, and the notches are preferably sloped to facilitate the movement of the handle 58', with its block, out any desired number of notches from said dotted line or inoperative position of the block, while inadvertent return of the latter to said inoperative position is prevented by the detent 61.

To the block 58 is attached a cord 64 which runs under a pulley 65, and, as shown in Fig. 1 up to a second pulley 66 and thence down to a weight 67, so that unless held by its detent, there is a tendency for the block 58 to move to its said inoperative position and thereby to swing the trough or guide 56 into the position in which it is shown in dotted lines in Fig. 9.

Below the detent 61 is a latch 68, pivoted to the block at 69 and provided with a spring 70 which tends to rotate it into the dotted line position thereof, shown in Fig. 10. So long however as the detent is in engagement with any notch 60', said latch is held in its full line position, shown in said figure. The downwardly extended arm 68' of this latch against which bears the spring 70, serves as a finger-piece whereby when the handle 58 is grasped by the hand of the operator, said piece may be moved into the recess 71 provided therefor in said handle to permit the detent to be clicked out past successive notches, or if the detent is held in its inoperative position by said latch, as it normally is after each movement of block 58 by its weight 67, the block may be moved out to the position thereof desired and the finger-piece may then be pressed to release the detent and thereby hold said block in said position.

The block 58 carries a pointer 72 which may point to any one of the figures shown on the lower side of the frame 5 in Fig. 11, in which latter it will be noted that portions of the frames 6 and 7 have been broken away for purposes of illustration. These figures correspond to the respective stations, of which there may be, for example, ten; and the setting of the block 58 with its trough 56 for any one of these determines the point of discharge of the load from a given carrier as will be hereinafter described.

When the trough or guide 56 moves from the position thereof corresponding to station 1, into its inoperative position, the side or flange of said trough nearest the latter will engage and move a bent finger 73 which is rigidly connected to an arm 74, pivoted at 75 to the upper part of the frame 6. This arm is held in the position thereof shown in full lines in Fig. 9, by a light spring 76, which however is not sufficiently strong to resist the action of the weight 67.

The outer end of arm 74 is shaped to provide a cam 74' which so long as the trough 56 is in its inoperative position is also inoperatively disposed. As soon however, as said trough is set, even for station 1, said cam moves out to its operative position to adapt it for engagement with lever 77 of the next approaching carrier.

A carrier lever 77 is pivoted at 78 to the rear of each carrier and is pressed by a spring 79 into its upper position, as shown in Fig. 3. For co-action with the lower arm 77'' of this lever, there is provided on each carrier a slide rod 80, mounted in bracket bosses 81—81' on the rear of said carrier. The boss 81' is preferably provided with a spring pressed detent 82 which may engage either of two recesses or notches in the rod 80; said detent being shown in the right-hand one of said recesses in Fig. 3.

The rod 80 is keyed in the boss 81, as by means of a feathered key 83, and said rod has affixed thereon, substantially intermediate said bosses, a horned block 84, the horn or projection 84' of which is adapted for engagement with the upper end of the carrier door-latch 18; this however only when the rod 80 has been moved so far to the right, as per Fig. 3, as to not only engage the detent 82 with the left-hand notch for the same but even farther, so that said detent rides on rod 80 to the left of both of said notches. When the bar has thus been moved to the right-hand limit of its travel by a lever 77', which is disposed on the other side of the carrier and is substantially like the lever 77, said bar does not stay in such limiting position after the lever 77' has been released from its cam 85, hereinafter referred to,—but moves one step to the left to bring detent 82 into engagement with the left-hand one of its notches; a rather stiff spring 86 being provided for this purpose. So long as the controlling rod 80 is in its extreme left-hand position, this spring 86 is free; but when said rod is moved to its intermediate position in which the detent 82 engages the left-hand notch, as aforesaid, then, spring 86 will preferably be placed slightly under compression by the adjacent end or hub of the member 84. When the rod 80 is moved still farther to the right by its lever 77', the spring 86 strongly tends to return said rod to its intermediate position, which lies between the dotted line and full line positions shown in Fig. 3.

In this intermediate position then, the controlling rod of a carrier which is to co-act other than merely idly with the cam 74', will be found; and as the lever 77 is rocked clockwise, as viewed in Fig. 3, its end 77'' will engage the adjacent end of said rod and move it into the position in which it is shown in said figure.

This movement brings an upstanding finger 87, which is pivoted at 88 to the number 84, into position to act as a stop against which may bear an arm 89 which projects from the central hub of the fingered piece 33, as best shown in Fig. 6. When this stop is thus interposed in the path of said arm 89, the arm 34 may be idly rocked by its roller 40 and any cam 41 which may be encountered by the latter,—the spring connection 37 between the finger-piece 33 and the rock-shaft 31 yielding and the lugs 38' and 39 being momentarily separated while the roller 40 is in engagement with such cam.

As in the preferred construction shown, the finger-piece will be in its elevated position when the cam 74' is thus caused to engage the lever 77, the arm 87 is yieldingly mounted on member 84, a spring 90 tending to move the arm 87 from its canted dotted line position in which it is shown in Fig. 3, counter-clockwise into its full line position, as soon as the piece 33 has resumed its normal position in which the end of the arm 89 clears the arm 87. Stops 91—92 on the members 84—87 limit this rotational movement of said arm; while since the left-hand end of spring 90 is attached to a collar 93 on rod 80, said spring moves with said rod as the latter is driven in one direction or the other.

Referring now to Figs. 1, 7 and 12, it will be observed that a cam 85, such as above referred to, is pivoted upon a spindle 94 to the frame 4 of each station, and an operating arm 85' is mounted upon the spindle, whereby said cam may be moved down into its operative position, shown in dotted lines in Fig. 7, or up into its full line position, as desired. To the end of this arm is connected a link 95, which extends down to an arm 96 mounted upon the end of a rock-shaft 97. Each station is provided with an actuating cam 98, fixedly mounted on this shaft at some position between the lugs 99 which carry said shaft, as shown in Fig. 12. The position however is variable and in fact corresponds with the respective station numbers shown on the frame 5 in Fig. 11 in accordance with which the controlling rod 52 is set by the trough or guide 56.

The operation of the apparatus will now be considered. Assuming that a load of one or more parcels has been placed upon the fingers 42 of the loading platform at, for example, station No. 10, and that the operator desires to despatch said parcels to station No. 1. The block 58 will be set as above described, so that its pointer will be directed to the numeral 1 of the scale on the frame 5 of the said station No. 10. This will set the trough 56 so that a vertical plane through the center of the narrow opening or throat at the left-hand end of said trough, between its converging walls 56', will be substantially the same distance from the right-hand rail shown in Fig. 11, as is a vertical plane through the center of the actuating cam 98 of said station No. 1.

If now an unloaded carrier approach the cam 41 of station No. 10, its roller 40 will engage said cam and the operating arm of said carrier will be rocked back to rotate its shaft 31. This elevates the fingers 33 which pass between the fingers 42 of the loading platform and sweep off the load into the receptacle of the carrier. The trap doors 8' of this latter, being latched up, will support the load, and the carrier will then travel on until its lever 77 is pushed down by the cam 74' which moved into the path of said lever when the block 58 was set for station No. 1.

The movement of lever 77 drives the controlling rod 80 from its intermediate position to the left as viewed in Fig. 3, and this brings the pivoted arm 87 against the extension 89 of the finger-piece 33.

When the latter was first rocked upwardly by the arm 34, the links 47 lowered the sliding frame composed of shaft 48, slide-connections 49, and rod 52, so that the end of this rod was dropped sufficiently to adapt it for engagement with the right-hand wall 56' of the trough 56, as viewed in Fig. 11.

This wall is usually the only one which comes into play at this time, but the opposite wall of the trough insures an exact positioning of the pin 52 as the latter rides out of the throat of said trough. The inclined right-hand wall 56', therefore, will drive the rod 52 over to a determined position with respect to the shaft 54, together, of course, with its slidably mounted supporting or guiding elements 51 and 53, and these latter frictionally hold rod 52 in said position thereafter, until after the discharge of the load from the carrier.

The depressed rod 52 having thus been set, it next encounters the preferably enlarged upper end of the detent 61, and rocks this latter to the left, as viewed in Figs. 8 and 10. This allows the weight 67 to draw the block 58 toward and into its inoperative position and correspondingly swings the trough into the position in which it is shown in dotted lines in Fig. 9.

The carrier now travels on, loaded; drawn by the cables 10, until it reaches the station for which it has been set to discharge its load,—to wit, station No. 1. Meanwhile, as soon as the roller 40 of said carrier had cleared the cam 41 of station 10, the arm 34 together with its fingers 33 had rocked back into the position in which these parts are shown in full lines in Figs. 3 and 6. This movement permitted the spring 90 to pull the arm 87 into the path of the part 89 so that thereafter until the rod 80 was again moved toward the right as per Fig. 3,—said fingers 33 could not be elevated, and the operating arm 34 would merely rock idly at each station passed.

When fingers 33 are thus held against movement, obviously the rod 53 is also held in its upper position, so that it can clear every trough 56 encountered, until it is again permitted to be lowered by the carrier operating arm.

In the case under consideration, the station No. 1, for which the load is destined, happens to be the next one to the station from which the load was despatched, as shown in Fig. 1; the track conveniently being considered to begin its circuit at, for example, said station No. 1. Upon the arrival of said carrier at said station, and after it has passed the frame 4 thereof, its rod 52 will engage and depress the cam 98, because it has been set so to do. This rocks down the cam 85 and while this latter is thus depressed, it is engaged by the lever 77' of said carrier which results in a corresponding depression of said lever. This movement of said lever drives rod 80 to the right, as viewed in Fig. 3, and the horn or projection 84' rocks the latch 18 shown in said figure, to the right, which correspondingly rotates the latch shaft 20 against the action of its spring 23, so that both latches 18 are released from their pins 22, and the doors 8' are free to drop open and deposit their load in the receptacle 29 therebeneath.

As the lever 77' clears cam 85, the spring 86 returns the rod 80 to its intermediate position and the carrier is now free to pick up a load from station No. 1, for transmission back to station No. 10, or to any intermediate station.

Before the cam 7 of station No. 1 is encountered by the roller 40 of said carrier, the cam-sections 30' of the bars 30 will be engaged with the rollers 26 on the carrier doors to close the latter; the latches 18 being of course operative at such time.

If a load is to be picked up at station No. 1, the trough 56 will have been set as above described and the various operations of loading, setting the controlling mechanism of the carrier, unloading the carrier and unsetting said mechanisms will be again gone through, substantially as per the foregoing.

If no load is to be despatched from station No. 1, then its trough will have been swung fully to the right as viewed in Fig. 11, by the passage of some previous carrier past said station, and in such case, the rod 52, being depressed by the cam 41 of station No. 1, will engage the left-hand wall 56', as viewed in said figure, and will be wiped over thereby into the position in which it is shown in dotted lines in Fig. 3, or in other words to the extreme right.

The cam 74' will obviously be inoperatively disposed under such circumstances and hence will not interfere with the intermediate setting of the passing carrier.

Having thus described my invention what I claim is:

1. In despatch apparatus for parcels and the like, the combination of a track, a series of stations located along said track, a carrier to travel along said track, a device at at least one of said stations for supporting an article to be despatched, a sweep-off element carried by said carrier and adapted when operatively disposed to wipe said article off of said supporting device onto said carrier while the latter is passing said device, means to move said sweep-off element with respect to its carrier, to operatively dispose it to wipe said article off of said device as aforesaid, adjustable means, carried by said carrier to prevent said last-mentioned means from thus operatively disposing the sweep-off element, and means at another of said stations for controlling the setting of said adjustable means as said carrier passes said last mentioned station.

2. In despatch apparatus for parcels and the like, the combination of a substantially horizontal track, a plurality of stations located along said track, a support at one of said stations, comprising substantially horizontal fingers adapted to hold in position thereon an article to be despatched, the free ends of said fingers pointing in the direction in which said article is to be despatched, a carrier to travel along said track having a receptacle for articles to be conveyed and a set of fingers toward the rear of said receptacle, adapted to pass in upstanding position between the horizontal fingers of said support and to sweep the article held by said horizontal fingers longitudinally with respect to the latter toward their free ends, and means to propel said carrier along said horizontal track to effect said relative movement between said upstanding and horizontally extending fingers.

3. In despatch apparatus for parcels and the like, the combination of a substantially horizontal track, a plurality of stations located along said track, a support at one of said stations, comprising substantially horizontal fingers adapted to hold in position thereon an article to be despatched, the free ends of said fingers pointing in the direction in which said article is to be despatched, a carrier to travel along said track having a receptacle for articles to be conveyed and a set of fingers toward the rear of said receptacle, adapted to pass in upstanding position between the horizontal fingers of said support and to sweep the article held by said horizontal fingers longitudinally with respect to the latter toward their free ends, and means to elevate and lower said fingers on said carrier.

4. In despatch apparatus for parcels and the like, the combination of a substantially horizontal track, a plurality of stations located along said track, a support at each of said stations, comprising substantially horizontal fingers adapted to hold in position thereon an article to be despatched, the free ends of said fingers pointing in the direction in which said article is to be despatched, a carrier to travel along said track having a receptacle for articles to be conveyed and a set of movable fingers adapted to pass when in an upstanding position between the horizontal fingers of a support and to sweep the article held by said horizontal fingers longitudinally with respect to the latter toward their free ends, means to displace said movable fingers with respect to said carrier, into their said upstanding position as the carrier approaches the article on said horizontal fingers, adjustable means to prevent said finger displacing means from so positioning said movable fingers, and means at another of said stations for loading said carrier and setting said adjustable means to prevent said movable fingers from operating to sweep a second load onto the first.

5. In despatch apparatus for parcels and the like, a track having therealong a plurality of stations, a carrier to travel along said track and having a load supporting part adapted to be inclined with respect to the plane of said track to dump the load in said carrier out of the latter, means to hold said part in its load retaining position, means to release said part from its holding means, controlling means carried by said carrier and adjustable out of a determined position thereof into any one of a plurality of positions each of which latter corresponds to one of said stations, means to load said carrier and substantially simultaneously set its controlling means in correspondence with the station at which said load is to be discharged, a device at each of said stations to co-act with said controlling means only when the latter is set in the one of said positions which corresponds with the said device of such station, for causing said controlling means to operate said releasing means to dump the load from the carrier, and means to automatically return said controlling means to said determined position.

6. In despatch apparatus for parcels and the like, a track having therealong a plurality of stations, a carrier to travel along said track and having a load supporting part adapted to be inclined with respect to the plane of said track to dump the load in said carrier out of the latter, means to hold said part in its load retaining position, means to release said part from its holding means, controlling means carried by said carrier and adjustable out of a determined position thereof into any one of a plurality of positions each of which latter corresponds to one of said stations, means to load said carrier and substantially simultaneously set its controlling means in correspondence with the station at which said load is to be discharged, and a device at each of said stations to co-act with said controlling means only when the latter is set in the one of said positions which corresponds with the said device of such station, for causing said controlling means to operate said releasing means to dump the load from the carrier.

7. In despatch apparatus for parcels and the like, a track having therealong a plurality of stations past each of which it extends substantially horizontally, a carrier to travel along said track and having a receptacle a load supporting part of which is adapted to be inclined with respect to the horizontal plane of said track at any given station to unload said receptacle at said station, means to hold said part in its load retaining position, means to release said part from its holding means, controlling means carried by said carrier and adjustable out of a determined position thereof into any one of a plurality of positions each of which latter corresponds to one of said stations, means operative while said carrier is traveling past a station, to load said receptacle and set its controlling means in correspondence with the station at which said load is to be discharged, a device at each of said stations to co-act with said controlling means only when the latter is set in the one of its said positions which corresponds with the said device of such station, for causing said controlling means to operate said releasing means to dump the load from the receptacle, and means to automatically return said controlling means to said determined position thereof.

8. In despatch apparatus for parcels and the like, a track having therealong a plurality of stations past each of which it extends substantially horizontally, a carrier to travel along said track and having a receptacle a load supporting part of which is adapted to be inclined with respect to the horizontal plane of said track at any given station to unload said receptacle at said station, means to hold said part in its load retaining position, means to release said part from its holding means, controlling means carried by said carrier and adjustable out of a determined position thereof into any one of a plurality of positions each of which latter corresponds to one of said stations, carrier loading means, including fingered load supporting platforms at each of said stations, fingers mounted on the carrier for upward movement to co-act with said fingered platforms to load said receptacle as the carrier passes a station at which it is to be loaded and means to control the upward movement of said fingers on the carrier as said station is approached, in combination with means to set said controlling means in correspondence with the station at which said load is to be discharged, and a device at each of said stations to co-act with said controlling means only when the latter is set in the one of its said positions which corresponds with the said device of such station, for causing said controlling means to operate said releasing means to dump the load from the receptacle.

9. In despatch apparatus for relatively heavy parcels and the like, a track having therealong a plurality of stations past each of which it extends substantially horizontally, a carrier to travel along said track and having a receptacle with a trap-like bottom adapted to open to drop parcels out of said receptacle, loading platforms at each of said stations, means for automatically transferring a load from one of said platforms to said receptacle as the carrier passes said platform, adjustable controlling means carried by said carrier to determine the destination of said load, provisions to prevent the emplacement of a second load upon the first when passing a subsequently encountered loading platform, means to automatically set said controlling means and provisions at substantially the time that said carrier is loaded from a given platform, and devices at each of said stations, each differently adjusted in correspondence with the location of their respective stations along the track, for co-acting with said controlling means according to the setting of the latter, to cause said carrier to drop its load at the station for which said controlling means was set.

10. In despatch apparatus for relatively heavy parcels and the like, a track having therealong a plurality of stations past each of which it extends substantially horizontally, a carrier to travel along said track and having a receptacle with a trap-like bottom adapted to open to drop parcels out of said receptacle, loading platforms at each of said stations, means for automatically transferring a load from one of said platforms to said receptacle as the carrier passes said platform, adjustable controlling means carried by said carrier to determine the destination of said load, means to automatically set said controlling means at substantially the time that said carrier is loaded from a given platform, and devices at each of said stations, each differently adjusted in correspondence with the location of their respective stations along the track, for co-acting with said controlling means according to the setting of the latter, to cause said carrier to drop its load at the station for which said controlling means was set.

11. In despatch apparatus for relatively heavy parcels and the like, a track having therealong a plurality of stations past each of which it extends substantially horizontally, a carrier to travel along said track and having a receptacle with a trap-like bottom adapted to open to drop parcels out of said receptacle, loading platforms at each of said stations, means for automatically, sweeping a load from one of said platforms into said receptacle as the carrier passes said platform, adjustable controlling means carried by said carrier to determine the destination of said load, provisions to prevent the emplacement of a second load upon the first when passing a subsequently encountered loading platform, means to automatically set said controlling means and provisions at substantially the time that said carrier is loaded from a given platform, and devices at each of said stations, each differently adjusted in correspondence with the location of their respective stations along the track, for co-acting with said controlling means according to the setting of the latter, to cause said carrier to drop its load at the station for which said controlling means was set.

12. In despatch apparatus for relatively heavy parcels and the like, a track having therealong a plurality of stations past each of which it extends substantially horizontally, a carrier to travel along said track and having a receptacle with a trap-like bottom adapted to open to drop parcels out of said receptacle, loading platforms at each of said stations, means for automatically transferring a load from one of said platforms to said receptacle as the carrier passes said platform, adjustable controlling means carried by said carrier to determine the destination of said load, provisions to prevent the emplacement of a second load upon the first when passing a subsequently encountered loading platform, means to automatically set said controlling means at substantially the time that said carrier is loaded from a given platform, devices at each of said stations, each differently adjusted in correspondence with the location of their respective stations along the track, for co-acting with said controlling means according to the setting of the latter, to cause said carrier to drop its load at the station for which said controlling means was set and means to close said trap-like bottom of said receptacle after the load has been dropped therefrom.

13. In despatch apparatus, a track having therealong a plurality of stations past each of which it extends substantially horizontally, a carrier to travel along said track and having a load supporting part adapted to be inclined with respect to the plane of said track to dump any load in said carrier out of the latter, means to hold said part in its load retaining position, means to release said part from its holding means, controlling means carried by said carrier and adjustable out of a determined position thereof into any one of a plurality of positions to determine the station at which said carrier shall be unloaded, a guide to set said controlling means at the station where the load is emplaced on the carrier, said guide being adjustable out of a determined position thereof into any one of a plurality of positions each of which corresponds to one of the plurality of positions aforesaid of said controlling means, means connected to said guide for movement therewith to cause the return of said controlling means to its said determined position when said guide occupies its determined position, means to hold said guide in the one of its plurality of positions in which it may be set, and means to move said guide back to its determined position after it has set said controlling means on the carrier.

14. In despatch apparatus, a track having therealong a plurality of stations past each of which it extends substantially horizontally, a carrier to travel along said track and having a load supporting part adapted to be inclined with respect to the plane of said track to dump any load in said carrier out of the latter, means to hold said part in its load retaining position, means to release said part from its holding means, controlling means carried by said carrier and adjustable out of a determined position thereof into any one of a plurality of positions to determine the station at which said carrier shall be unloaded, a guide to set said controlling means at the station where the load is emplaced on the carrier, said guide being adjustable out of a determined position thereof into any one of a plurality of positions each of which corresponds to one of the plurality of positions aforesaid of said controlling means, means connected to said guide for movement therewith to cause the return of said controlling means to its said determined position when said guide occupies its determined position, means to hold said guide in the one of its plurality of positions in which it may be set, means to move said guide back to its determined position after it has set said controlling means on the carrier, and means to prevent the disturbance of said controlling means after it has been set until after said carrier has reached the station at which it is to unload.

15. In despatch apparatus, a track having therealong a plurality of stations, a carrier to travel along said track, means to unload said carrier, controlling means carried by said carrier and adjustable out of a determined position thereof into any one of a plurality of positions to determine the station at which said carrier shall be unloaded, a guide to set said controlling means at the station where the load is emplaced on the carrier, said guide being adjustable out of a determined position thereof into any one of a plurality of positions each of which corresponds to one of the plurality of positions aforesaid of said controlling means, means connected to said guide for movement therewith to cause the return of said controlling means to its said determined position when said guide occupies its determined position, means to hold said guide in the one of its plurality of positions in which it may be set, and means to move said guide back to its determined position after it has set said controlling means on the carrier.

16. In despatch apparatus, a track having therealong a plurality of stations, a carrier to travel along said track, means to unload said carrier, controlling means carried by said carrier and adjustable out of a determined position thereof into any one of a plurality of positions to determine the station at which said carrier shall be unloaded, a guide to set said controlling means at the station where the load is emplaced on the carrier, said guide being adjustable out of a determined position thereof into any one of a plurality of positions each of which corresponds to one of the plurality of positions aforesaid of said controlling means, means connected to said guide for movement therewith to cause the return of said controlling means to its said determined position when said guide occupies its determined position, means to hold said guide in the one of its plurality of positions in which it may be set, means to move said guide back to its determined position after it has set said controlling means on the carrier, and means to prevent the disturbance of said controlling means after it has been set until after said carrier has reached the station at which it is to unload.

17. In despatch apparatus, a track having therealong a plurality of stations, carriers to travel along said track and adapted to be loaded from above the same while traveling past a station; a loading platform at at least one of said stations and comprising substantially horizontal fingers supported from points above the level of said fingers and at the ends of said horizontal fingers which are nearest to a carrier as the latter approaches the same, sweep-off fingers movable up and down on said carrier with respect to the latter and adapted when elevated to pass between the platform fingers to sweep off a load from the latter onto said carrier, means to control said sweep-off fingers and to determine the point of discharge of said load from said carrier, and means to set a part of said controlling means from a point adjacent the loading platform aforesaid into any one of a plurality of adjustments thereof in correspondence with the station at which said carrier is to be unloaded.

18. In despatch apparatus, a track having therealong a plurality of stations, carriers to travel along said track and adapted to be loaded from above the same while traveling past a station; a loading platform at at least one of said stations and comprising substantially horizontal fingers supported from points above the level of said fingers and at the ends of said horizontal fingers which are nearest to a carrier as the latter approaches the same, sweep-off fingers movable up and down on said carrier with respect to the latter and adapted when elevated to pass between the platform fingers to sweep off a load from the latter onto said carrier, means to control said sweep-off fingers and to determine the point of discharge of said load from said carrier, and means to set a part of said controlling means from a point adjacent the loading platform aforesaid into any one of a plurality of adjustments thereof in correspondence with the station at which said carrier is to be unloaded, said last mentioned means being below the path of travel of said carrier.

19. In despatch apparatus, a track having therealong a plurality of stations, carriers to travel along said track and adapted to be loaded from above the same while traveling past a station; a loading platform at at least one of said stations and comprising substantially horizontal fingers supported from points above the level of said fingers and at the ends of said horizontal fingers which are nearest to a carrier as the latter approaches the same, sweep-off fingers movable up and down on said carrier with respect to the latter and adapted when elevated to pass between the platform fingers to sweep off a load from the latter onto said carrier, means to control said sweep-off fingers and to determine the point of discharge of said load from said carrier, and means to set a part of said controlling means from a point adjacent the loading platform aforesaid into any one of a plurality of adjustments thereof in correspondence with the station at which said carrier is to be unloaded, said last mentioned means comprising converging guides one of which acts to set said part of said controlling means as aforesaid and the other of which acts to unset said part of a succeeding carrier previously set to unload at said station.

20. In despatch apparatus, a track having therealong a plurality of stations, carriers to travel along said track, means to automatically unload any given one of said carriers at a determined one of said stations, a controlling device, carried by each carrier and adapted to be set to determine the station at which said carrier is to be unloaded, and means to set a part of said controlling device from a point adjacent the station from which the load is despatched, into any one of a plurality of adjustments thereof in correspondence with the station at which said carrier is to be unloaded, said setting means comprising converging guides one of which acts to set said part of said controlling device as aforesaid and the other of which acts to unset said part of a succeeding carrier previously set to unload at said station.

21. In despatch apparatus, a track having therealong a plurality of stations, carriers to travel along said track, means to automatically unload any given one of said carriers at a determined one of said stations, a controlling device carried by each carrier and adapted to be set to determine the station at which said carrier is to be unloaded, means to set a part of said controlling device from a point adjacent the station from which the load is despatched, into any one of a plurality of adjustments thereof in accordance with the station at which said carrier is to be unloaded, means, an operating element of which is located at each of said stations, for projecting and retracting said part laterally with respect to the path of travel of said carrier, said part being adapted for engagement with said setting means only when projected by said last mentioned means, means to prevent said projection of said part when the latter has been set, means at each of the stations variably set in different positions with respect to the line of travel of said carriers and each corresponding to one of said plurality of adjustments of said part, to selectively co-act with said part when in its retracted position, and means, controlled by the co-action of said part and last mentioned means, to actuate said unloading means.

22. In despatch apparatus, a track having therealong a plurality of stations, carriers to travel along said track and adapted to be loaded from above the same while horizontally traveling past a station; a loading platform at at least one of said stations and comprising substantially horizontal fingers supported from points above the level of said fingers and at the ends of said horizontal fingers which are nearest to a carrier as the latter approaches the same, a sweep-off device on said carrier, portions of which are adapted to pass between said horizontal fingers to sweep off a load from the latter onto said carrier, means to effect relative vertical movement between said device and said horizontal fingers, and means to control the action of said last mentioned means, to determine the points along said track at which said device shall co-act with said fingers.

In testimony whereof I have affixed my signature in the presence of two witnesses.

CHESTER S. JENNINGS.

Witnesses:
R. E. FISKE,
J. I. CARR.

Copies of this patent may be obtained for five cents each, by addressing the "Commissioner of Patents, Washington, D. C."